H. C. PIERCE.
Churn.
No. 35,110.  Patented April 29, 1862.
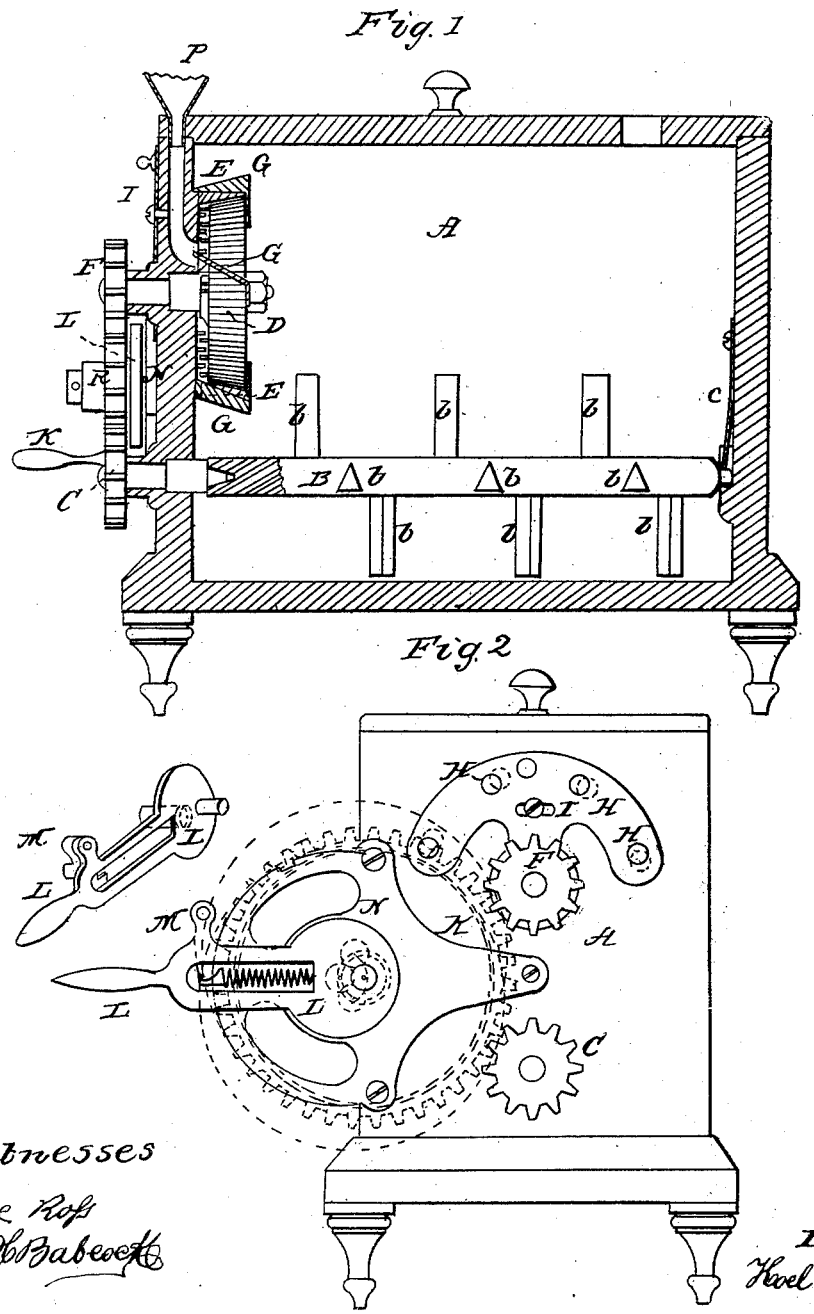

UNITED STATES PATENT OFFICE.

HOEL C. PIERCE, OF HOMER, NEW YORK.

IMPROVEMENT IN CHURNS.

Specification forming part of Letters Patent No. 35,110, dated April 29, 1862.

*To all whom it may concern:*

Be it known that I, HOEL C. PIERCE, of Homer, in the county of Cortland and State of New York, have invented certain new and useful Improvements in Churns; and I do hereby declare that the following is a full and exact description thereof, reference being had to the accompanying drawings, in which—

Figure 1 is a vertical longitudinal section, and Fig. 2 is an end elevation, of my improved churn.

Similar letters of reference refer to like parts in both the figures.

My invention relates to that kind of churns in which a rubbing-disk is used in combination with a revolving series of dashers; and the nature of my invention consists in the arrangement of certain parts in combination with the rubbing-disk and revolving dasher, whereby either may be made to revolve or both together at will from the same driving-wheel, and the said driving-wheel may be readily changed from one condition or the other; also, in the combination, with the rubbing or mixing disk, of certain wings or fans for drawing in atmospheric air and causing it to mingle with the cream as it leaves the said rubbing-disk; also, in the arrangement, in combination with the said wings or fans and rubbing-disk, of adjustable openings for the admission of air thereto in greater or lesser quantities, as may be desired, in order to adapt the operation to variations in the temperature of the air or of the cream.

To enable others skilled in the art to make and use my invention, I will proceed to describe its construction and operation by the aid of the drawings.

A is the receptacle for the milk or cream, of any desirable form, suitable for the reception of the churning mechanism. Near the bottom of this receptacle I mount a shaft, B, having wedge-formed beaters *b b* arranged spirally thereon. This shaft receives its motion from the pinion C on the exterior of A, and it is so hung that it may be readily removed for cleaning and replaced for use by simply depressing the spring *c*. Above B and at the end of the receptacle A, I mount a corrugated wheel or disk, D, in a corresponding case or recess, E, which is also toothed or corrugated. This disk receives a rotary motion through the pinion F. Upon the disk D, I affix wings or arms G G, arranged spirally relative to the axis of D, which arms extend over the case E, and by their action while the disk is revolving draw in air through the holes H H in the side of A. This air is thus caused to mingle freely with the cream as it escapes from the disk D, and improves the quality of the butter not only by its well-known direct action upon the cream, but also by reducing the temperature thereof. A suitable hole is provided in the cover for the escape of the surplus air; but in cold weather it is desirable to introduce less air than in warm, as it is not desirable to cool the cream below a certain temperature, as is well known to dairymen, and to allow of the admission of any desired amount of air to suit the varying conditions of the weather and cream I provide a sliding plate, I, with holes corresponding to those in A, by which the holes H H may be partially or entirely closed at will.

Between the pinions C and F, I mount a spur-wheel, K, upon an eccentric lever, L, which lever is so proportioned that wheel K may be caused to mesh into both C and F, as shown by the red outline, or into either alone, at will, as shown by the dotted circles, by simply moving the handle of L up or down, as represented. To retain it in either of these positions, I provide a spring-catch, M, upon L, which enters notches *n* in the casting N, on which L is hung. When it is desired to change the wheel K from one position to the other, the hand is placed upon L and the catch M released from N by one finger or by the other hand, when L is shifted to the desired position, which is indicated by M falling into the proper notch in N. Motion is communicated to K through a handle, *k*, or by any other convenient means.

The operation of my churn is as follows: The wheel K being set to gear with the pinion F, the cream is poured into the funnel P and the disk D rotated rapidly. In passing through between this disk and its case E the cream is thoroughly mingled and broken up, so as to admit of more rapid churning, and is mixed with the air drawn in by the wings G G, the admission of the proper amount of air being controlled by the sliding plate I. When the cream has all passed through the disk, the wheel k is shifted so as to revolve only the dashers or beaters b b, which operate in the ordinary manner.

I am aware that churns have heretofore been made with revolving disks and dashers combined, and so arranged that either or both could be used at pleasure; but I am not aware that the equivalent of my lever L, spring-catch M, and notched plate N have before been employed in such combination. Neither am I aware that the wings G and adjusting-plate I have before been used in combination with such revolving disk.

I therefore claim as my invention—

1. The arrangement of the eccentric lever L, spring-catch M, and notched plate N, in combination with the wheel K, pinions C and F, disk D, and dasher-shaft B, substantially as and for the purpose herein described.

2. The employment of the wings G, in combination with the disk D and holes H H, substantially as and for the purpose set forth.

3. The employment of the plate I or its equivalent, in combination with the disk D, wings G, and holes H, for the purpose of controlling the admission of air to the interior of the churn, substantially as herein set forth.

In testimony whereof I have hereunto set my hand in the presence of two subscribing witnesses.

HOEL C. PIERCE.

Witnesses:
J. M. PIERCE,
GEORGE ROSS.